(12) United States Patent
DiFilippo (10) Patent No.: US 6,744,039 B1
(45) Date of Patent: Jun. 1, 2004

(54) SINGLE-CHAMBER FILLABLE PHANTOM FOR NUCLEAR IMAGING

(75) Inventor: Frank P. DiFilippo, Strongsville, OH (US)

(73) Assignee: Biomec, Inc., Cleveland, OH (US)

( * ) Notice: Subject to any disclaimer, the term of this patent is extended or adjusted under 35 U.S.C. 154(b) by 169 days.

(21) Appl. No.: 10/125,156

(22) Filed: Apr. 18, 2002

Related U.S. Application Data (60) Provisional application No. 60/298,610, filed on Jun. 14, 2001.

(51) Int. Cl.⁷ ................................................. G12B 13/00
(52) U.S. Cl. .................................................. 250/252.1
(58) Field of Search ........................... 250/252.1, 505.1

(56) References Cited

U.S. PATENT DOCUMENTS

| | | |
|---|---|---|
| 3,509,337 A | 4/1970 | De Clerk et al. |
| 3,657,534 A | 4/1972 | De Clerk et al. |
| 3,867,638 A | 2/1975 | Golden |
| 4,014,109 A | 3/1977 | Schramm |
| 4,280,047 A * | 7/1981 | Enos ....................... 250/252.1 |
| 4,460,832 A * | 7/1984 | Bigham ................... 250/505.1 |
| 4,499,375 A | 2/1985 | Jaszczak |
| 4,649,561 A | 3/1987 | Arnold |
| 4,724,110 A | 2/1988 | Arnold |
| 5,227,627 A * | 7/1993 | Gamarnik et al. ....... 250/252.1 |
| 5,481,115 A | 1/1996 | Hsieh et al. |

OTHER PUBLICATIONS

Cone Instruments; Nuclear Medicine Supplies and Accessories; vol. 7, 2001–2002; pp. 90–96.
Nuclear Associates; Diagnostic Imaging and Radiation Therapy Catalog—Quality Instruments and Accessories; pp. 169–173.
Biodex Medical Systems; Nuclear Medicine Supplies and Accessories; Catalog #94; May 2001; pp. 24–30.

* cited by examiner

Primary Examiner—John R. Lee
Assistant Examiner—Christopher M. Kalivoda
(74) Attorney, Agent, or Firm—Pearne & Gordon LLP (57) ABSTRACT

A fillable phantom for use with nuclear imaging system. The phantom includes a container having a connector for filling the container with radioactive solution. A porous medium within the container holds and distributes the radioactive solution. One or more contrasting region(s) formed in the porous medium is/are in fluid communication with the porous medium in order to absorb the radioactive solution.

37 Claims, 7 Drawing Sheets

FIG. 1A

PRIOR ART

SINGLE-CHAMBER FILLABLE PHANTOM FOR NUCLEAR IMAGING

This invention was made with Government support under Grant Nos. 1R43-CA86555-01, and 2R44. CA86555-02 awarded by the National Institutes of Health. The licensee acknowledges that the U.S. Government has certain rights in this invention under 37 C.F.R. §401 including a non-exclusive, non-transferable, irrevocable, paid-up license in this invention and the right in limited circumstances to require the patent owner to license others on reasonable terms as provided for by the terms of the above identified grants awarded National Institutes of Health.

CROSS-REFERENCE TO RELATED APPLICATION(S)

This application claims the benefit of U.S. Provisional Application No. 60/298,610 filed Jun. 14, 2001.

BACKGROUND OF THE INVENTION

The present invention relates to phantoms for nuclear imaging, and more specifically to a phantom fillable with a solution of a radioisotope for providing radioactive regions or "hot spots" within a less radioactive or "warm" background.

Medical physicists and researchers in nuclear imaging commonly use fillable phantoms for characterizing the imaging capabilities of both single photon emission computed tomography (SPECT) and positron emission tomography (PET) systems. Most common phantoms have simple designs and often are designed to measure specific imaging parameters, such as line sources for spatial resolution and open fillable chambers for uniformity. However, in recent years, there has been growing interest in more complex phantom designs to assess imaging performance in realistic imaging situations.

With the more widespread use of radiopharmaceuticals such as $^{18}$F-fluorodeoxyglucose (FDG), $^{99m}$Tc-Sestamibi, and $^{111}$In-labeled and $^{131}$I-labeled monoclonal antibodies for oncology imaging, the ability of SPECT and PET scanners to detect lesions of higher activity concentration with respect to the surrounding tissue is of high interest. To simulate the imaging of tumors in patients, phantoms with fillable spheres are typically used. Before imaging the phantom, the physicist or technologist fills the spheres and background chamber with solutions with the desired concentration ratio of activity. Although the design of this phantom is relatively simple, there are several disadvantages to this approach. The accuracy and reproducibility of the spheres-to-background concentration ratio is not guaranteed, since the steps of measuring the activities and volumes and of filling the chambers have the possibility of error. In addition, such phantoms with multiple fillable chambers are inconvenient to use because of the number of steps involved in preparation. The time required to fill these phantoms (typically 30 minutes) is costly, and it also prevents lesion detectability studies with isotopes with very short half-lives. A more convenient and more reproducible phantom design that simulates active lesions in a patient is therefore highly desirable.

Attenuation correction in nuclear medicine also is rising in significance. Attenuation correction provides a more quantitative uptake distribution in images, and many believe that more accurate diagnosis can be obtained. The commercial implementations of attenuation correction in nuclear imaging systems are many and often fundamentally different. Commercial attenuation correction approaches range from stationary line sources, to scanning point sources, to multi-modality x-ray computed tomography (CT) systems: CT/SPECT and CT/PET. Comparing the imaging capabilities between scanners and ensuring the daily quality of attenuation-corrected images is vital. Other than "cold-spot" phantoms using inserts of different materials, there are no phantoms specifically designed to test the attenuation correction capability of nuclear medicine systems, even though the need for such a phantom is growing.

Anthropomorphic phantom designs are also of interest. Phantoms with inserts to simulate cardiac uptake are commercially available, and anthropomorphic phantoms with chambers for lungs, heart, and liver are also available. Such phantoms are useful for better simulating patient imaging and for observing the effect of attenuation correction and scatter correction. While these complex phantoms provide more imaging detail, they are correspondingly more inconvenient to use because of the increased number of chambers to fill.

Phantoms are routinely used in nuclear medicine for several purposes. Phantoms for single photon emission computed tomography (SPECT) and positron emission tomography (PET) are fixtures that contain a radioisotope source of a specific geometry. Often, phantoms are used for characterizing the performance of SPECT and PET systems. There are guidelines from organizations such as the National Electrical Manufacturers Association (NEMA) and the American Association of Physicists in Medicine (AAPM) which recommend several phantoms, such as point sources, line sources, and fillable cylindrical chambers. These phantoms are specially designed to measure specific performance characteristics of the scanner, including spatial resolution and sensitivity. Manufacturers also use these performance measures in marketing their SPECT and PET systems.

An important use for phantoms is for quality assurance (QA) of SPECT and PET scanners. Hospital physicists follow specific daily, weekly, and monthly protocols to ensure proper operation of their imaging systems. Regular QA is critical for ensuring proper image quality and proper diagnostic accuracy of patient images. While the methodology for performance testing from NEMA gives valuable information about system performance, many of the tests require specialized equipment and sophisticated software. As a result, more convenient QA phantoms are used for routine testing. The most desirable characteristics of phantoms for QA are ease of use and reproducibility. Therefore, QA phantoms are designed to be simple and convenient to fill.

Figure 1A:
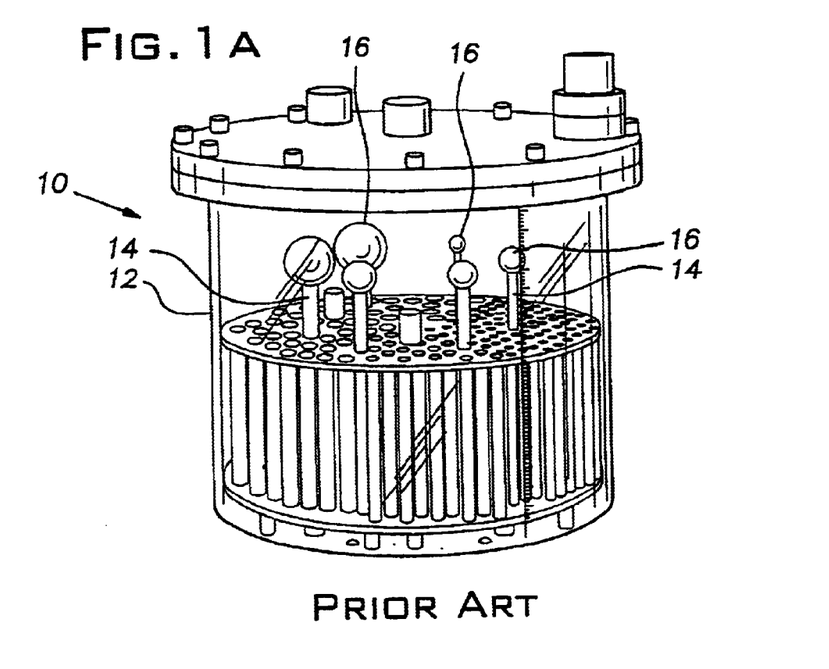
FIG. 1A is perspective view showing a "Jaszczak" phantom having "cold" spheres and "cold" rods according to the prior art.

For example, as shown in FIG. 1A, the Jaszczak phantom 10 comprises a cylindrical chamber 12 containing arrays of solid plastic rods 14 and several solid plastic spheres 16 of various diameters. The Jaszczak phantom is what is commonly referred to as a "cold spot" phantom having a "warm background," in that the spheres show up on a scan as radio-neutral regions in a radioactive background. The Jaszczak phantom 10 is pillable using a single injection of radioisotope, and the resulting images yield information regarding scanner contrast resolution and performance, but not lesion conspicuity.

Another field of interest for SPECT and PET phantoms is research. Physicists utilize phantoms of various geometries, and often simulate the human body in order to test novel image reconstruction algorithms and data correction capabilities. Examples of such phantoms are the anthropomorphic torso phantom 20 available from Data Spectrum, shown in FIG. 1B, and the Hoffman brain phantom 30, shown in FIG. 1C.

Figure 1B:
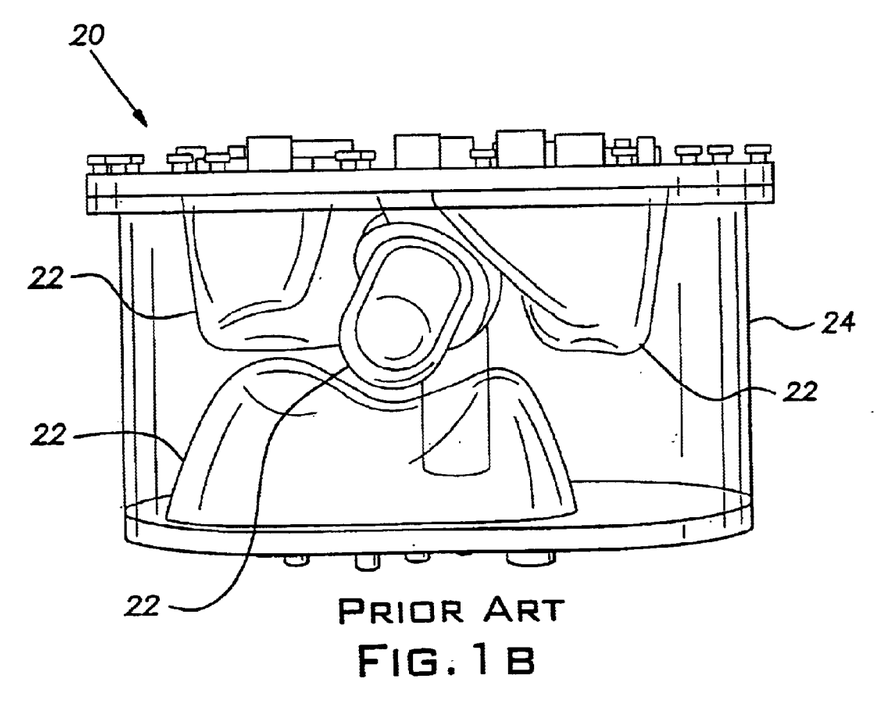
FIG. 1B is a front elevational view showing an anthropomorphic phantom having individual fillable chambers according to the prior art.

The torso phantom 20 comprises a plurality of individual chambers 22, representing human organs, which can be filled with a radioactive solution. A main chamber 24 can be filled with a different radioactive solution. Thus, the torso phantom 20 can be used to provide "hot" spots in a "warm" background. However, the steps of filing each of the individual chambers 22 of the torso phantom 20 is time consuming. Further, the requirement of the preparation of different radioactive solutions for producing contrast among the chambers 22 and/or between the chambers 22 and the main chamber 24 leads to poor repeatability, since human error will naturally produce variations in the concentrations of the solutions each time they are prepared.

Figure 1C:
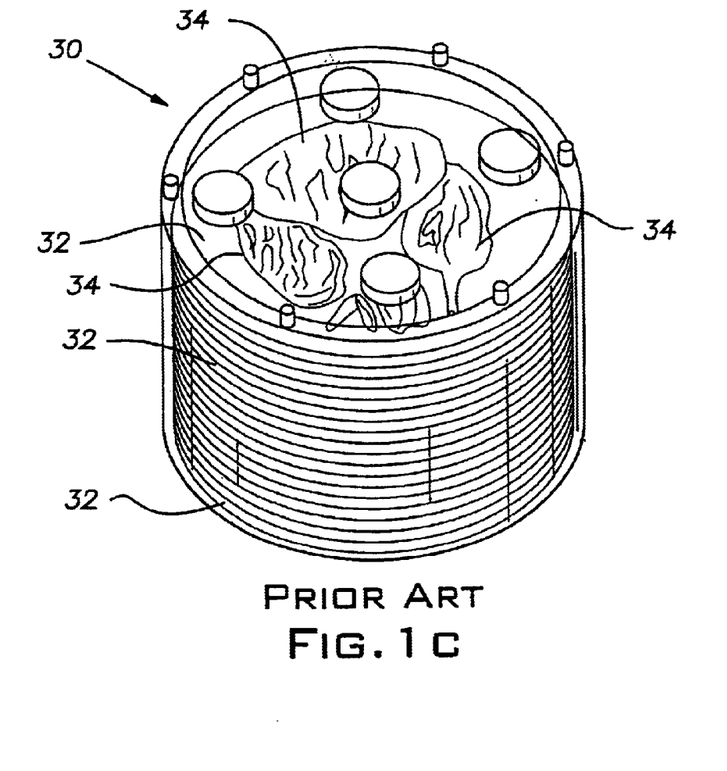
FIG. 1C is a perspective view showing a "Hoffman" three-dimensional brain phantom according to the prior art.

The Hoffman brain phantom 30 comprises a single fillable chamber defined by nineteen individual plates 32 that stack within a cylindrical container. The plates 32 each include open chamber portions 34 which hold the radioactive solution when the phantom 30 is filled. When the plates 32 are stacked together, varying thicknesses of the chamber portions 34 and surrounding solid portions cooperate to simulate the gray and white matter of the human brain.

Nuclear medicine research using phantoms has been steadily increasing in recent years because of the availability of advanced imaging hardware and software. The efficacy of methods for quantitative SPECT and PET, such as attenuation correction, scatter correction, and collimator deblurring, continues to be investigated by researchers. Of particular interest is the effect of these corrections on specific clinical applications, such as for oncology and cardiac imaging.

Another approach to phantoms for nuclear imaging was recently developed in which an ink-jet printer loaded with radioisotope solution is used to print pages with the desired planar isotope distributions. To create a three-dimensional phantom having an activity distribution that is virtually attenuation-free and scatter-free, the pages are stacked vertically with a constant spacing (such as 10 mm) between the planes. Slabs of other material can be placed between the sheets to modify the attenuation and scatter properties. While this approach is useful in allowing greater flexibility in phantom design, it is not convenient for regular use, since a user must prepare the printer, print many sheets, cut the sheets to size, and stack the sheets. Improving phantom's axial sampling requires more sheets and more preparation time. Thus a phantom design that is more convenient and that is able to simulate the complex imaging tasks of interest is still highly desirable.

Lesion detection is a specific imaging task of great interest in nuclear medicine. The percentage of oncology cases in nuclear medicine imaging has been steadily increasing in recent years and is now approximately 40% of the total. The more widespread use of radiopharmaceuticals, such as $^{18}$F-fluorodeoxyglucose (FDG), $^{99m}$Tc-Sestamibi, and $^{111}$In-labeled and $^{131}$I-labeled monoclonal antibodies, has driven this increase in oncology cases. The measure of performance that is of clinical interest is the minimum detectable lesion size with respect to the lesion-to-background uptake ratio. The detectable lesion size is a key measure of both clinical conspicuity and relative scanner performance. For example, a recently published study by Coleman et al. used a torso phantom with fillable spheres to compare the conspicuity of lung tumors using three types of 511 keV imaging systems: dedicated PET, gamma camera PET, and collimated SPECT. Phantom studies such as this are critical for assessing the efficacy of SPECT and PET imaging for oncology (which enters into decisions on insurance reimbursement), since the presence or absence of secondary lesions is a strong consideration for the course of therapy to follow.

Another important factor in lesion detectability is the location of the lesion within the body. Because of the nonuniform response of sensitivity, resolution, attenuation, and scatter, the ability to detect a lesion depends greatly on the organs being imaged. Therefore, using phantoms that accurately mimic the human body is highly desirable, since the lesion detectability in a standard cylindrical phantom may be quite different. However, existing anthropomorphic phantoms have limited reproducibility and are relatively difficult to use.

Lesion detectability in SPECT and PET imaging has become such an important performance characteristic of scanners that lesion detection has recently been included in an industry standard test. The recently revised NEMA (National Electronic Manufacturers Association) NU-2-2001 standard "Performance Measurements of Positron Emission Tomographs" includes an image quality measurement based upon multiple fillable spheres. Key issues in implementing this standard include reproducibility and accuracy.

Reproducibility of phantom imaging is a critical characteristic for comparing scanner performance and for routine quality assurance. Lesion detection studies require knowledge of the activity concentration ratio of the simulated lesions with respect to the background volume. Filling multiple chambers in a phantom introduces the possibility of producing an incorrect concentration ratio.

Figure 2A:
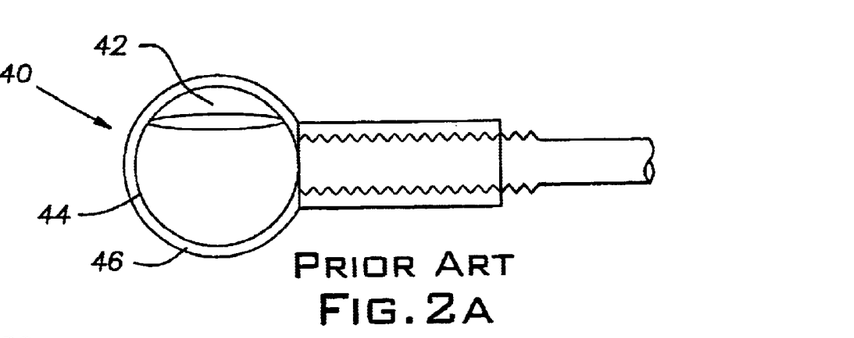
FIG. 2A is a fillable sphere for a phantom according to the prior art, shown with an air bubble due to underfilling.
Figure 2B:
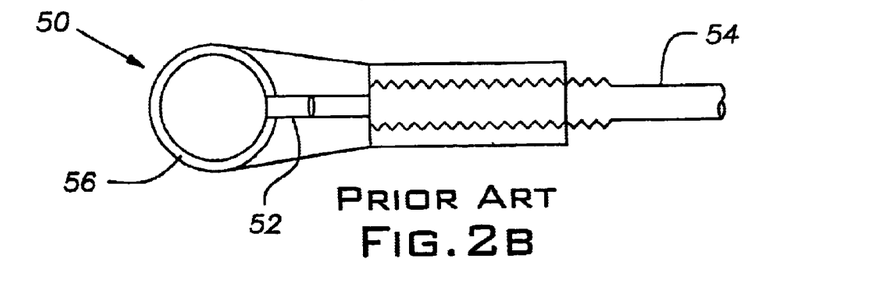
FIG. 2B is a fillable sphere for a phantom according to the prior art, shown overfilled.

The reproducibility of the concentration ratio is limited with conventional phantom designs, such as the fillable spheres 40, 50 shown respectively in FIGS. 2A and 2B. In order to fill multiple chambers with the desired concentration ratios, the relative volumes of the chambers must be known precisely, and measuring the activities and volumes of liquids introduces many possibilities for error. In addition, as shown in FIG. 2A, leaving a bubble 42 in the fillable chamber 44 alters the effective concentration. As shown in FIG. 2B, it is also possible to "overfill" a sphere 50 by adding liquid to the neck 52 of the sphere 50 that attaches to a mounting rod 54. Another point that affects the imaging accuracy is the nonzero thickness of the walls 46, 56 of the fillable chambers. The walls 46, 56 translate into a region of zero activity, which also alters the effective concentration. The effect is substantial for small chambers. For example, a fillable sphere with outside diameter of 9 mm and a wall thickness of 0.5 mm has a fractional "dead space" of 16%. The errors in the apparent activity concentration and size of fillable spheres in PET imaging have been found to be large for small spheroids, approaching 25% for spheres of 13 mm diameter, for example.

Finally, convenience of filling the phantom is a vital requirement for its widespread use. Unfortunately, for conventional phantom designs the difficulty of filling the phantom rises as the complexity of the phantom rises. The main obstacle is the number of chambers to be filled, since each chamber requires the steps of planning, measuring, and filling. Lack of convenience has been a main reason why lesion detection phantoms are not used for routine QA. The time required to prepare accurately a phantom with fillable spheres depends on the experience and patience of the technologist, but the typical time is on the order of 30 minutes or longer.

SUMMARY OF THE INVENTION

The present invention provides a fillable phantom for use with nuclear imaging systems. The phantom comprises a container comprising a connector for filling the container with radioactive solution, a porous medium within the container for holding the radioactive solution, and a contrasting region formed in the porous medium and being in fluid communication with the porous medium.

According to another aspect, the present invention provides a fillable phantom for use with nuclear imaging systems comprising a porous medium for holding a radioactive solution, and a contrasting region formed in the porous medium. The porous medium comprises a solid material comprising a plurality of vertical channels formed in the solid material.

According to a further aspect, the present invention provides a fillable phantom for use with nuclear imaging systems comprising a porous medium for holding a radioactive solution, and a contrasting region formed in the porous medium. The porous medium comprises a plurality pellets bonded together and defining interstices.

According to a still further aspect, the present invention provides a fillable phantom for use with nuclear imaging systems, the phantom comprising a porous medium for holding a radioactive solution, and a contrasting region formed in the porous medium. The porous medium comprises an open cell foam.

According to yet a further aspect, the present invention provides a system for filling a fillable phantom for use with nuclear imaging systems. The system comprises a phantom comprising a container, a porous medium within the container, and a contrasting region formed in and in fluid communication with the porous medium. The system further comprises an external mixing container for preparing a radioactive solution with which the phantom is to be filled. The chamber is connectable to the phantom for filling the phantom with the solution and for draining the solution from the phantom.

According to yet another aspect, the present invention provides a method of preparing a phantom for use with a nuclear imaging system. The method comprises steps of: providing a phantom comprising a phantom container and a porous medium within the container having a contrasting region formed in the porous medium, and filling the phantom with a radioactive solution so that the solution flows into the porous medium and into each of the contrasting regions. The radioactive solution comprises a liquid medium and a radioactive isotope.

According to a still further aspect, the present invention provides a process of manufacturing a phantom for use with a nuclear imaging system. The process comprises steps of: cutting a plurality of wafers; punching a plurality of perforations in each of the plurality of wafers; drilling holes in appropriate ones of the plurality of wafers so that when the wafers are stacked with the plurality of perforations aligned, a void of a desired shape is formed; stacking the wafers with the pluralities of perforations in alignment; bonding the stacked wafers together to form a porous medium for the phantom; and inserting the wafers into a phantom container.

According to an even further aspect, the present invention provides a process of manufacturing a phantom for use with a nuclear imaging system. The process comprises steps of: filling a container with a plurality of pellets; imbedding a dissolvable solid among the plurality of pellets; compressing the pellets within the container; bonding the plurality of pellets to form a porous medium; dissolving the dissolvable solid; and eliminating the dissolved solid from the porous medium to leave a void in the shape of the dissolvable solid.

DETAILED DESCRIPTION OF THE INVENTION

Figure 3:
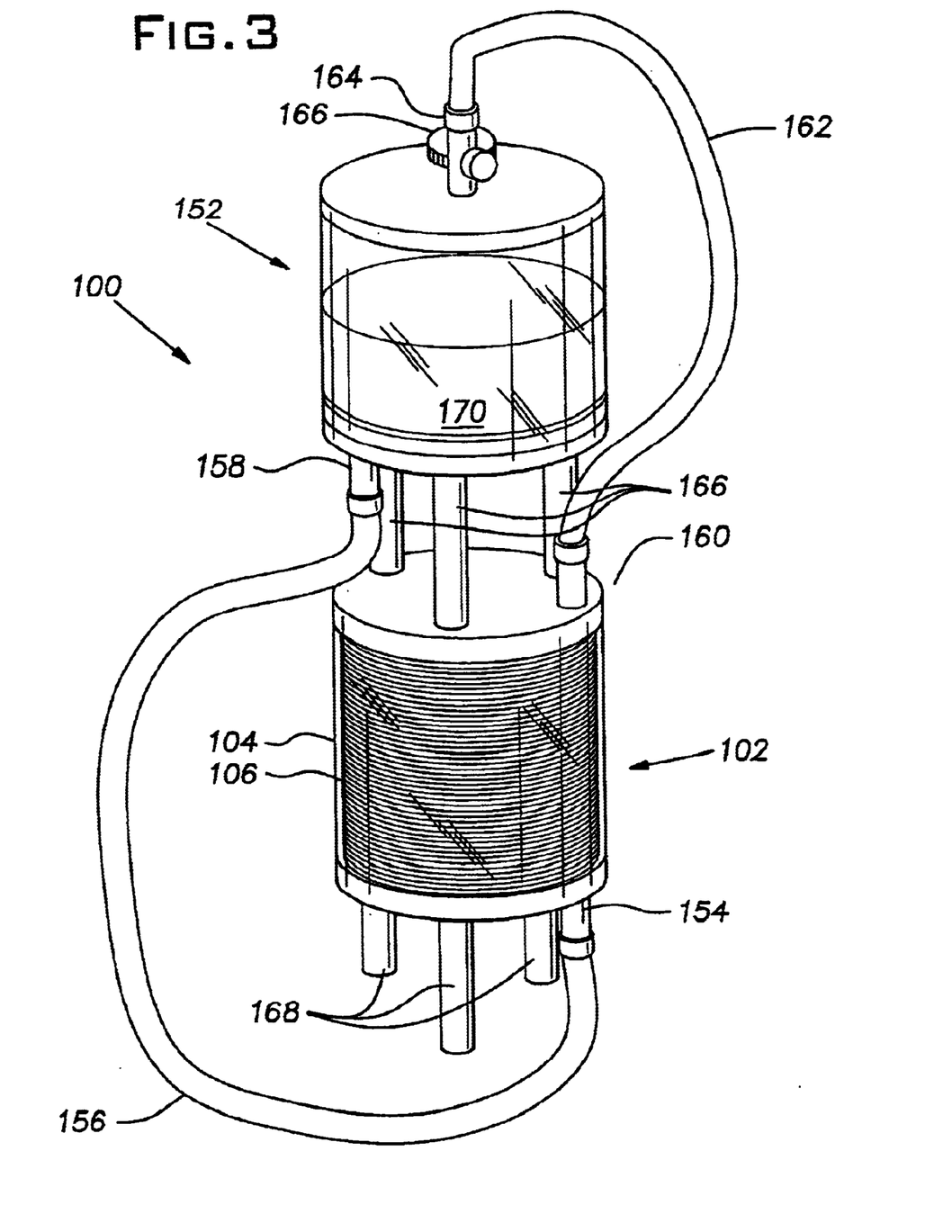
FIG. 3 is a perspective view showing a filling system of a nuclear imaging phantom according to the present invention, shown in a filling position.
Figure 4:
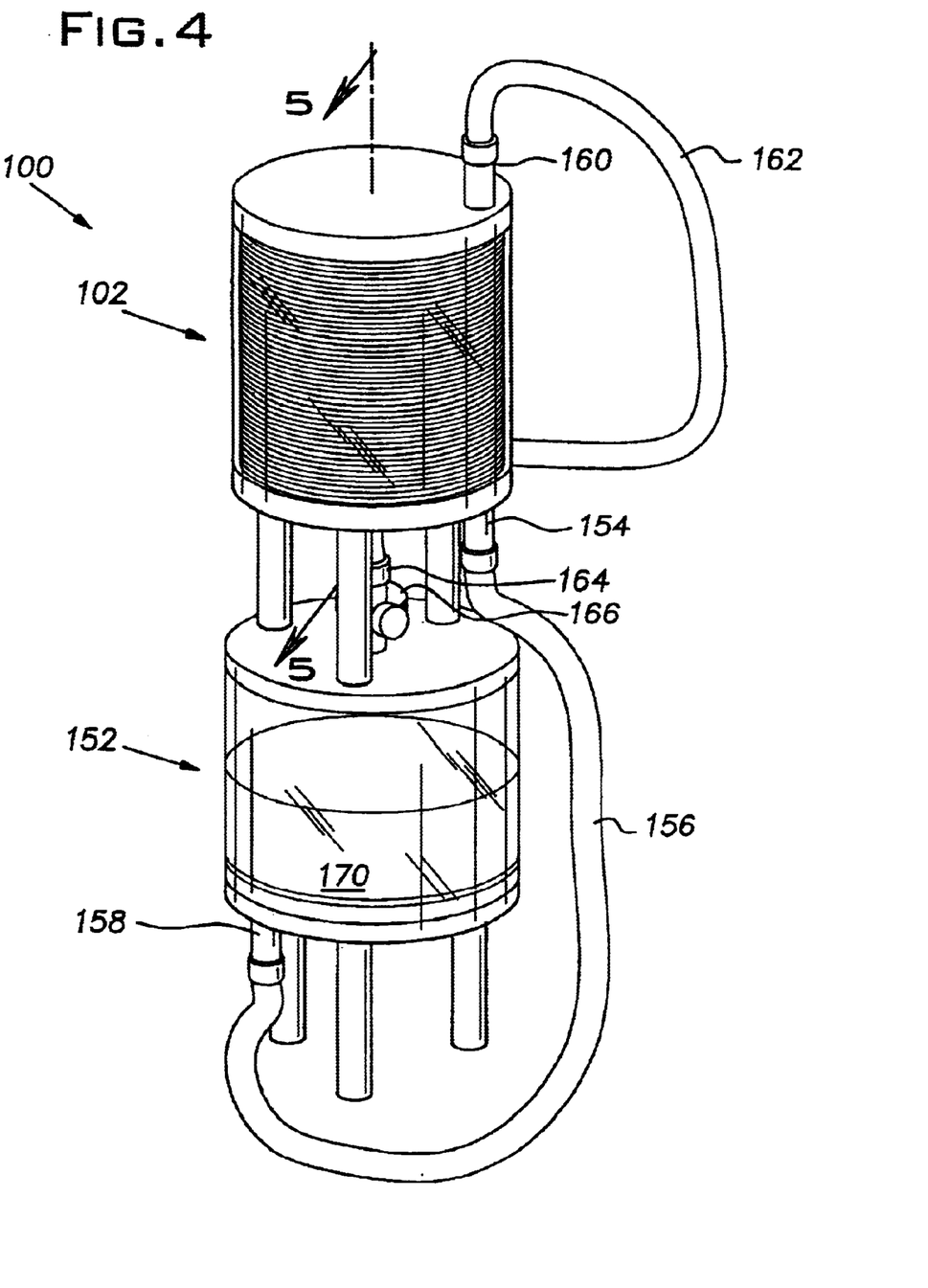
FIG. 4 is a perspective view showing the filling system of FIG. 3 in a draining position.
Figure 5:
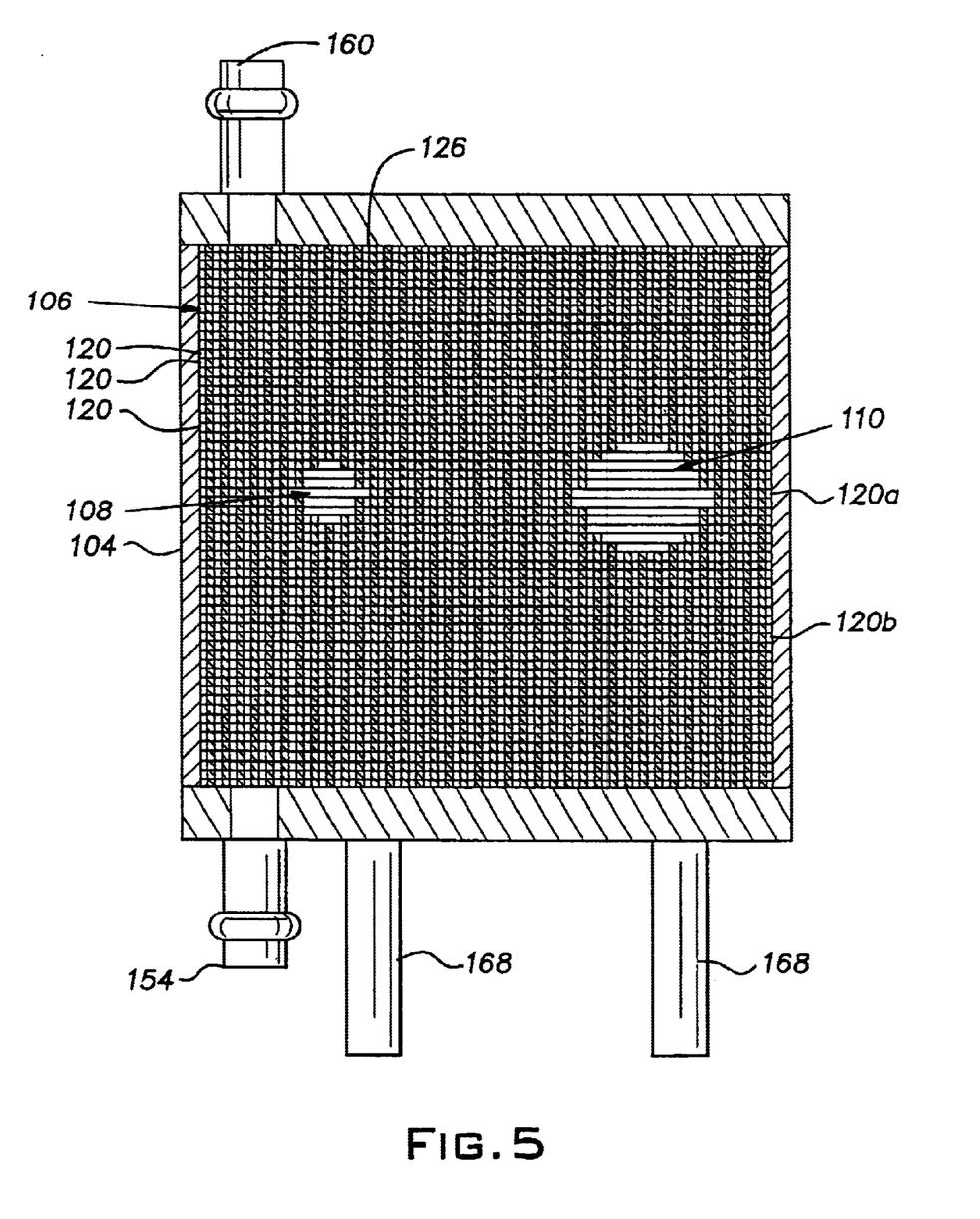
FIG. 5 is sectional view of the nuclear imaging phantom of FIG. 3 taken along section line 5—5 in FIG. 4.

FIGS. 3–5 show a filling system 100 for a fillable nuclear imaging phantom 102 according to the present invention. The phantom 102 has a single fillable container 104 defining a chamber containing a porous medium 106. The term "porosity" as used herein refers to the fraction as a percent of the total volume occupied by minute channels or open spaces in a solid.

As used herein, "contrasting regions" refer to a difference in the overall radioactivity of a particular region of a phantom as compared to another region of that phantom when each of the regions is filled with a radioactive liquid. With reference to FIG. 5, the porous medium 106 includes spherical voids 108, 110 for providing radioactively contrasting regions in the porous medium when filled with a radioactive liquid. As will be described below in more detail with reference to FIG. 8, as an alternative to the voids of FIG. 5, one or more contrasting regions can be provided by way of porous inserts 132 having a porosity that is diverse to the porosity of the porous medium 106. It should be appreciated that the contrasting regions can be formed in any desired shape, such as other ellipsoids, toroids, prisms, or amorphous solids, including anthropomorphic shapes. When the phantom 102 is filled with a radioactive solution, such as a radioisotope dissolved in a liquid medium, the phantom 102 results in having a radioactive background with areas of varying concentration defined by the contrasting regions.

Figures 6, 6A, 7, 8:
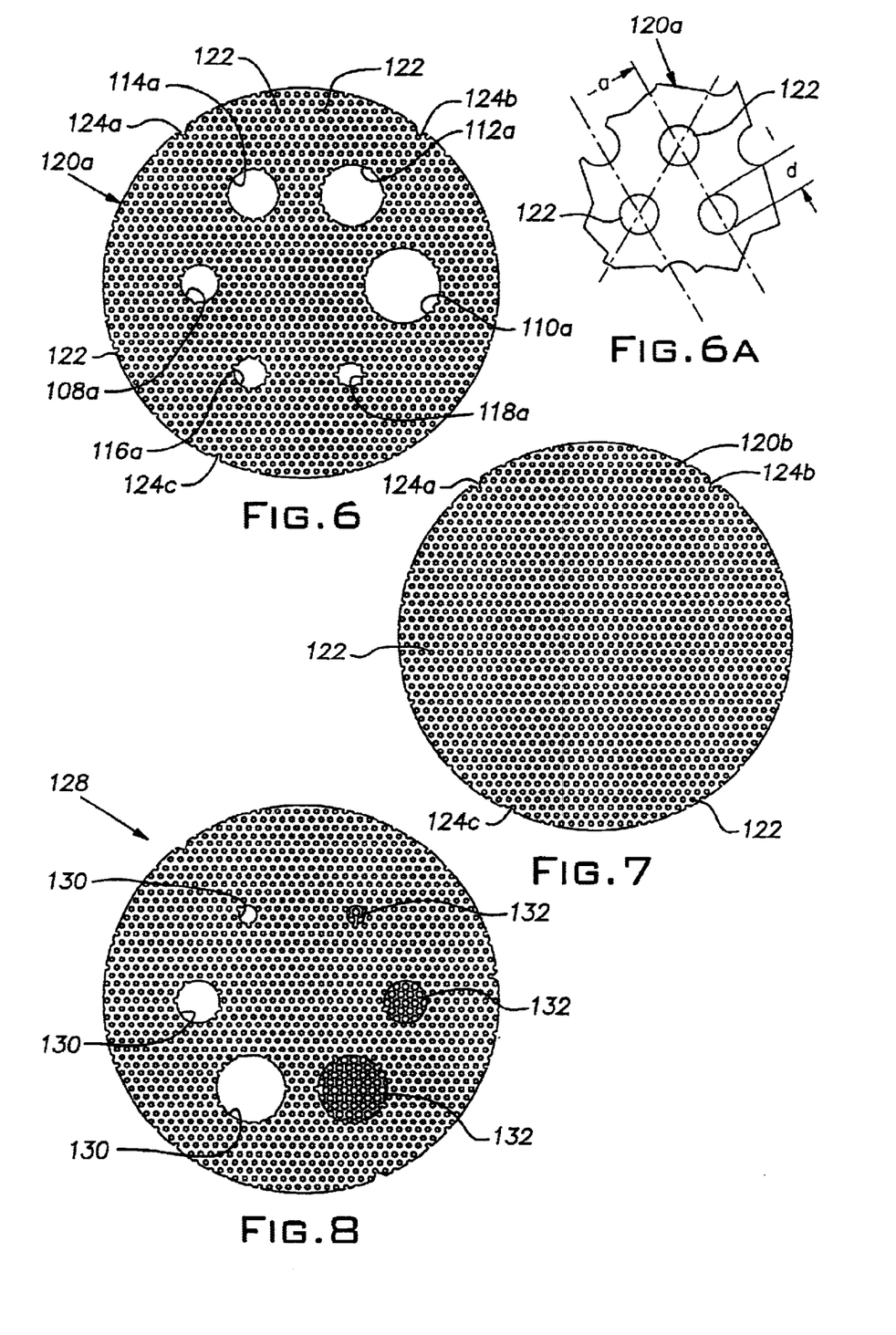
FIG. 6 is a plan view of a wafer for a nuclear imaging phantom according to the present invention.
FIG. 6A is an enlarged detail of a portion of the wafer of FIG. 6 illustrating pore geometry.
FIG. 7 is a plan view of another wafer for a nuclear imaging phantom according to the present invention.
FIG. 8 is a plan view of a wafer for an alternative embodiment of a nuclear imaging phantom according to the present invention.

In the embodiment illustrated in FIGS. 3–7, and with specific reference to FIGS. 5–7, the porous medium 106 comprises a plurality of sheets or wafers 120 vertically stacked into the form of a cylinder and positioned within the container 104. The wafers 120 are made from a perforated material, such as plastic, having a plurality of uniformly distributed pores or perforations 122.

The perforated plastic wafers 120 are manufactured by die-stamping molded plastic pieces. Alternatively, plastic sheets may be manufactured by rolling sheet stock material through rollers with tines of the desired size and spacing and then cut into wafers. Further, other methods of producing the perforated wafers 120 may be used, for example, molding the wafers with the pores.

As shown in FIG. 6, the voids 108, 110 are formed by drilling or otherwise removing appropriate circular portions from each of the wafers 120. For example, circular or disc-shaped holes 108a and 110a are drilled in the wafer 120a which corresponding to a particular planar section of the porous medium 106 to form the voids 108, 110. The wafer 120a shown in FIG. 6 is merely representative of the design of individual wafers 120. The voids defined by the regions 112a, 114a, 116a and 118a are not visible in the sectional view of FIG. 5. FIG. 7 shows a wafer 120b for a part of the porous medium 106 in which no voids are present. Upon stacking and aligning each of the wafers 120 having appropriate disc-shaped holes, the spherical voids 108, 110 are formed.

In order provide a uniform criterion for a scanner, no feature of the wafers should measure greater than the spatial resolution of the scanner, including the size of the pores 122, the spacing between the pores 122, and the thickness of the wafers 120. Any feature less than the spatial resolution of the scanner will not be discernable in a scan. In the embodiment of FIGS. 6–8 and shown in detail in FIG. 6a, since the pores are circular, the pore size is related as the diameter, d, of the pores 122. Further, the pores 122 are in a hexagonal close-packed configuration and the pore spacing, a, is measured center-to-center. A typical PET scanner has a spatial resolution of no less than 4 mm full width at half maximum (FWHM). Thus a phantom for such a PET scanner should have a pore diameter, d, pore spacing, a, and wafer thickness each being less than 4 mm.

Still referring to FIG. 6a, when the porous medium 106 is filled with a radioactive liquid, the effective concentration ratio of a void 108, 110 to the surrounding porous medium 106 depends on the size and spacing of the pores 122. If a spherical void is formed within the stacked cylinder, the effective concentration ratio, r, of the spherical void 108, 110 to background porous medium 106 is calculated as:

$$r = \frac{2a^2\sqrt{3}}{\pi d^2}.$$

As an example, wafers formed having 1.8 mm pore diameters (d), and 3.6 mm pore spacing (a) has an effective concentration ratio (r) of about 4.4:1, between the voids and the porous medium.

As shown in FIGS. 6 and 7, each of the wafers 120, has a set of keyways 124a, 124b, 124c corresponding to keys (not shown) in the interior of the phantom container 104. Thus, when the wafers 120 are inserted into the container having the keyways aligned, the pores 122 are also aligned so that vertical channels 126 are formed in the resulting porous medium 106 (see FIG. 5). By way of these channels 126, each of the wafers 120 is in fluid communication with all of the other wafers 120. As an alternative to the layered wafer approach, one or more blocks of a solid material could be provided with vertical channels by way of drilling through the material. As a further alternative, the blocks could be formed with the channels therein, such as deposition using a stereolithic apparatus (SLA) or by way of selective laser sintering (SLS).

Further, each wafer 120 is bonded to adjacent wafers 120 in the stack by heat pressing the entire stack. Other means of bonding the wafers 120 together could be used, such as solvent-bonding or applying an adhesive. As a further alternative, the wafers 120 could be clamped or otherwise held together using mechanical fasteners.

FIG. 8 shows a wafer 128 for an alternative embodiment of the present invention. The phantom of this embodiment has spherical voids formed by disc-shaped holes 130 and spherical regions formed by disc-shaped inserts 132 of a second porous material. The inserts 132 have a porosity different from the porosity of the porous material of the wafer 128. As a result, spheres of two different concentration ratios are provided.

Alternatively, three or more different concentration ratios can be provided in a single phantom by using materials of varying porosities. Further still, various voids and porous regions could be provided in shapes which simulate a human organ, such as the brain or organs within a torso. As a further alternative, non-porous regions providing "cold" spots could be provided within a porous medium along with voids and/or regions of varying degrees of porosity. It should be further appreciated that a phantom incorporating any combination of the various concepts described herein can be constructed within the scope of the present invention.

As an alternative to the layered wafer approach, other methods of constructing a porous medium for the phantom according to the present invention can be used. According to one alternative embodiment, a phantom container is filled with a plurality plastic beads or pellets. Spheres or other shapes made from a dissolvable solid material, such as sugar, are imbedded within the plurality of pellets.

In preparation for bonding the pellets together, the pellets are compressed slightly using a piston inserted into the container. The pellets are then bonded by sintering, being heated to a softening temperature below the melting temperature of the pellets. The pellets are removed from the heat and cooled, resulting in a single porous medium formed from the sintered pellets. The sintered porous medium is flushed with warm water or another solvent in order to dissolve the dissolvable solids, removing them from the porous medium and leaving behind corresponding voids.

Alternatively, the dissolvable solids can be replaced with porous materials in order to construct a sintered phantom having various concentration ratios. Further, it should be appreciated that various porous materials can be provided as a porous medium for a phantom according to the present invention. For example, an open-cell foam material could be used as the porous medium.

Figure 9A:
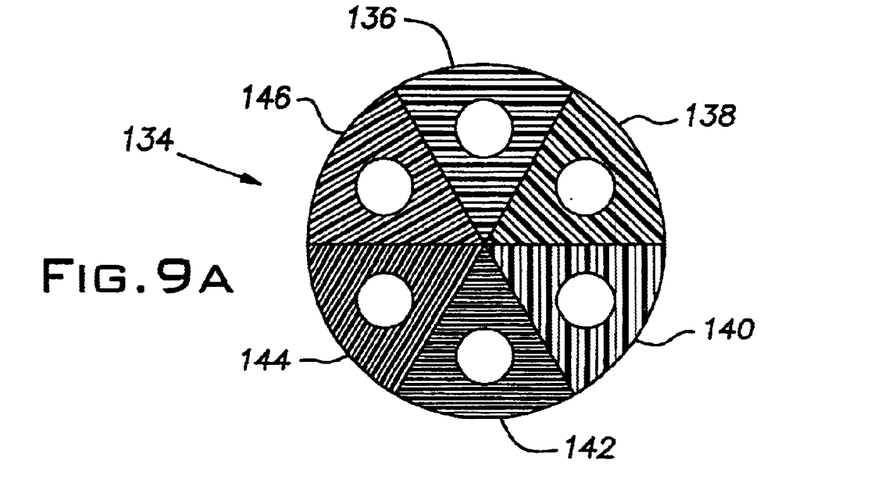
FIG. 9A is a diagrammatic view illustrating an attenuation correction testing phantom according to a further alternative embodiment of the present invention.

FIG. 9A diagrammatically shows an attenuation correction testing phantom 134 according to a further alternative embodiment of the present invention. Each pie-shaped section 136, 138, 140, 142, 144 and 146 of the phantom 134 is formed from a porous material of which may or may not have the same porosity as the other sections 136–146, but particularly has a different gamma ray, x-ray or other attenuation coefficient, as appropriate to the scanner being tested. One way to vary the attenuation coefficient between sections 136–146 would be to make them from materials having different mass densities. Further, the pie-shaped sections 136–146 are shown by way of example and, alternatively, sections having other shapes can be used.

Figure 9B:
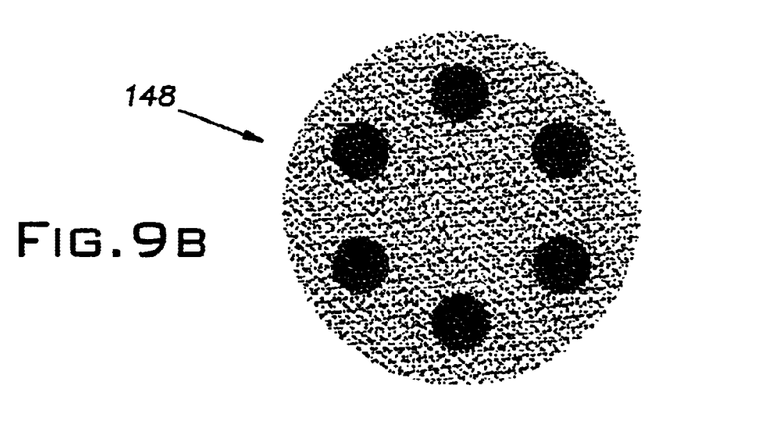
FIG. 9B is a diagrammatic view showing a first theoretical scan of the attenuation correction testing phantom of FIG. 9A.

FIG. 9B diagrammatically shows a theoretical scan 148 of the attenuation correction testing phantom 134 with a scanner having perfect attenuation correction. Scans of the various sections 136–146 appear homogeneously dark since their porosities are the same and thus their radioactive concentration ratios are also the same. Such a scan provides a verification of the effectiveness of attenuation correction of the scanner.

Figure 9C:
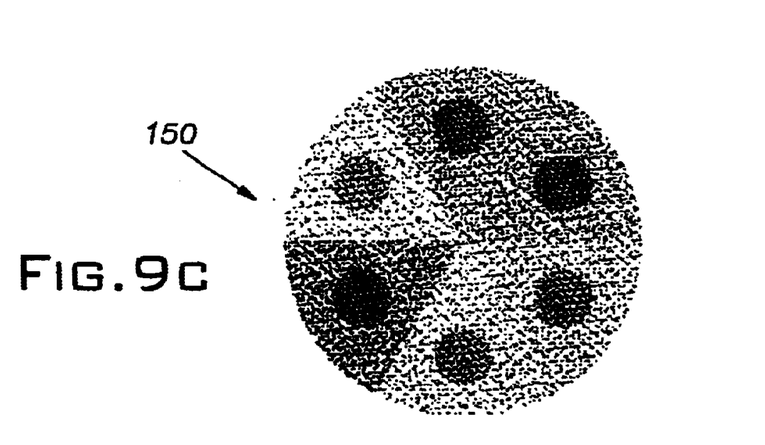
FIG. 9C is a diagrammatic view showing a second theoretical scan of the attenuation correction testing phantom of FIG. 9A.

FIG. 9C diagrammatically shows a theoretical scan 150 of the phantom 134 in which attenuation affects the scan. Varying attenuation caused by the varying densities of the different porous materials can be readily seen in the scan 150. Such a scan 150 may help a technician to determine the need for the scanner to be serviced and/or recalibrated.

Referring again to FIGS. 3–5, a filling system 100 for a fillable nuclear imaging phantom 102 according to the present invention is shown. The filling system 100 includes a phantom 102 and a mixing container 152. A liquid connector 154 in the bottom of the phantom 102 is connected by a liquid transfer tube 156 to a liquid connector 158 of the mixing container 152. An air connector 160 of the phantom 102 is connected by an air transfer tube 162 to an air connector 164 of the mixing container 152. A port 166 is provided in the top of the mixing container 152 for introducing a radioactive isotope.

Each of the connectors 154, 158, 160, 164 are "self-sealing," meaning that both the container side of each connector and the tube side of each connector automatically close and seal against fluid flow when disconnected from each other. This allows the phantom to be disconnected from the filling system and imaged independently, without the liquid draining from the phantom. Further, legs 166, 168 are respectively provided to the mixing container 152 and the phantom 102 to allow room for the connectors 154, 158, 160, 164.

Referring to FIG. 3, a method of filing the phantom 102 with a radioactive solution performed with the mixing container 152 positioned above and resting on the phantom 102. Thus, gravity is utilized to fill the phantom 102. The mixing container 152 is filled with a liquid medium 170 into which a desired radioisotope is introduced through the port 166. The mixing container 152 is agitated to thoroughly dissolve the radioisotope into the liquid medium 170.

Once the liquid medium 170 is prepared, gravity filing is commenced. The air connectors 160, 164 allow air from within the phantom 102 to be displaced into the mixing container 152. The phantom 102 is filled from the bottom to reduce the formation of air bubbles. A surfactant may also be added to the liquid medium 170 to alter the viscosity and to further reduce the formation of air bubbles. An appropriate commercially available surfactant may be used.

once the phantom 102 is completely filled, the tubes 156, 162 are disconnected so that the phantom 102 may be scanned. In the present embodiment, the connectors 154, 158, 160, 164 are quick-release type connectors with valves that seal the openings when disconnected.

As shown in FIG. 4, after the phantom has been scanned as desired and/or the radioisotope has decayed to below a useful level, the phantom 102 is positioned on above the mixing container 152 and the tubes 156, 162 are reconnected. The air connectors 160, 164 are opened allowing the liquid medium 170 to drain from the phantom 102 into the mixing container 152. Additional radioisotope can be mixed into the liquid medium 170 in the mixing container 152 and then the filling process is repeated.

What is claimed is:

1. A fillable phantom for use with nuclear imaging systems, the phantom comprising:
   a container comprising a connector for filling the container with radioactive solution;
   a porous medium within the container for holding the radioactive solution; and
   a contrasting region formed in the porous medium and being in fluid communication with the porous medium.

2. The fillable phantom of claim 1 wherein each of a pore size and a pore spacing are less than a spatial resolution of a nuclear imaging system with which the phantom is to be used.

3. The fillable phantom of claim 1 wherein the porous medium comprises a plurality of channels.

4. The fillable phantom of claim 1 wherein the contrasting region is a void.

5. The fillable phantom of claim 1 wherein the contrasting region comprises a contrasting porous medium having a porosity that is diverse from a porosity of the porous medium.

6. The fillable phantom of claim 1 wherein the contrasting region comprises a contrasting porous medium having a mass density that is different from a mass density of the porous medium.

7. The fillable phantom of claim 1 wherein the contrasting region comprises a contrasting porous medium having an attenuation coefficient that is different from an attenuation coefficient of the porous medium.

8. The fillable phantom of claim 1 wherein the contrasting region is formed in the shape of one of an ellipsoid, a toroid and a prism.

9. The fillable phantom of claim 1 wherein the contrasting region is formed in the shape of a part of a human body.

10. The fillable phantom of claim 1 wherein the container further comprises a side wall, a top wall and a bottom wall, and the connector being formed in the bottom wall.

11. The fillable phantom of claim 1 wherein the container is formed in the shape of a cylinder.

12. The fillable phantom of claim 1 wherein the porous medium comprises a plurality of perforated wafers stacked in layered arrangement.

13. The fillable phantom of claim 1 wherein the porous medium comprises a plurality of pellets bonded together.

14. The fillable phantom of claim 1 wherein the porous medium comprises an open cell foam.

15. The fillable phantom of claim 1 wherein the connector is self-sealing.

16. A fillable phantom for use with nuclear imaging systems, the phantom comprising a porous medium for holding a radioactive solution, and a contrasting region formed in the porous medium, wherein the porous medium comprises a solid material comprising a plurality of vertical channels formed in the solid material.

17. A fillable phantom for use with nuclear imaging systems, the phantom comprising a porous medium for holding a radioactive solution, and a contrasting region formed in the porous medium, wherein the porous medium comprises a plurality pellets bonded together and defining interstices.

18. A fillable phantom for use with nuclear imaging systems, the phantom comprising a porous medium for holding a radioactive solution, and a contrasting region formed in the porous medium, wherein the porous medium comprises an open-cell foam.

19. A system for filling a fillable phantom for use with nuclear imaging systems, the system comprising:

a phantom comprising a container, a porous medium within the container, and a contrasting region formed in and in fluid communication with the porous medium; and an external mixing container for preparing a radioactive solution with which the phantom is to be filled, the external mixing container being connectable to the phantom for filling the phantom with the solution and for draining the solution from the phantom.

20. The system according to claim 19 wherein the phantom is filled and drained by way of gravity.

21. The system according to claim 19 wherein one of the phantom and the external mixing container comprises a seal-sealing connection for connecting to the other of the phantom and the external mixing container.

22. A process preparing a phantom for use with a nuclear imaging system comprising steps of:

providing a phantom comprising a phantom container and a porous medium within the container having a contrasting region formed in the porous medium; and filling the phantom with a radioactive solution so that the solution flows into the porous medium and into each of the contrasting regions, the radioactive solution comprising a liquid medium and a radioactive isotope.

23. The process of claim 22, further comprising a step of introducing a surfactant into the liquid medium.

24. The process of claim 22, further comprising a step of draining the solution from the phantom.

25. The process of claim 24, wherein the steps of filling and draining are performed by way of gravity.

26. The process of claim 22, further comprising steps of:

providing a mixing container having the liquid medium within the mixing container; and connecting the mixing container in fluid communication to the phantom container;

wherein the step of filling is performed using the mixing container.

27. The process of claim 26, further comprising a step of draining the liquid medium into the mixing container.

28. The process of claim 26, further comprising a step of introducing the radioisotope through an isotope port of the mixing container.

29. The process of claim 26, further comprising a step of agitating the mixing container to mix the isotope into the liquid medium to make the radioactive solution.

30. The process of claim 26, further comprising a step of connecting an air tube between the phantom container and the mixing container.

31. A process of manufacturing a phantom for use with a nuclear imaging system, the process comprising steps of:

cutting a plurality of wafers;

punching a plurality of perforations in each of the plurality of wafers;

drilling holes in appropriate ones of the plurality of wafers so that when the wafers are stacked with the plurality of perforations aligned, a void of a desired shape is formed;

stacking the wafers with the pluralities of perforations in alignment;

bonding the stacked wafers together to form a porous medium for the phantom; and inserting the wafers into a phantom container.

32. The process of claim 31, further comprising steps of:

cutting an insert for each of the holes;

punching a plurality of perforations in each of the inserts; and filing each of the holes with one of the inserts, the insert having a porosity due to the perforations that is diverse to a porosity of the of the respective wafer.

33. A process of manufacturing a phantom for use with a nuclear imaging system, the process comprising steps of:

filling a container with a plurality of pellets;

imbedding a dissolvable solid among the plurality of pellets;

compressing the pellets within the container;

bonding the plurality of pellets to form a porous medium;

dissolving the dissolvable solid; and eliminating the dissolved solid from the porous medium to leave a void in the shape of the dissolvable solid.

34. The process according to claim 33, wherein the step of bonding comprises heating the pellets to a softening temperature of the pellets.

35. The process according to claim 33, wherein the step of bonding occurs subsequent to the step of compressing.

36. The process according to claim 33, wherein the dissolvable solid comprises sugar.

37. The process according to claim 33, wherein the step of eliminating comprises flushing the porous medium with water.

* * * * *